United States Patent
Reuven et al.

(10) Patent No.: US 6,587,512 B1
(45) Date of Patent: Jul. 1, 2003

(54) APPARATUS AND METHODS FOR COMBINED PRECODING AND SHAPING GENERATING AN UNCORRELATED SEQUENCE OF SAMPLES

(75) Inventors: Ilan Reuven, Ramat Gan (IL); Liron Frenkel, Ramat Gan (IL)

(73) Assignee: Tioga Technologies Inc., San Jose, CA (US)

( * ) Notice: Subject to any disclaimer, the term of this patent is extended or adjusted under 35 U.S.C. 154(b) by 0 days.

(21) Appl. No.: 09/248,632

(22) Filed: Feb. 11, 1999

(51) Int. Cl.$^7$ .................................................. H04L 1/00

(52) U.S. Cl. .......................................... 375/296; 455/63

(58) Field of Search ................................. 375/285, 295, 375/296; 455/63, 296

(56) References Cited

U.S. PATENT DOCUMENTS

| | | | | |
|---|---|---|---|---|
| 3,905,034 A | * | 9/1975 | Jensen et al. ................ | 342/110 |
| 5,150,381 A | | 9/1992 | Forney, Jr. et al. ........... | 375/39 |
| 5,159,610 A | | 10/1992 | Eyuboglu et al. ............. | 375/18 |
| 5,249,200 A | | 9/1993 | Chen et al. .................... | 375/58 |
| 5,388,124 A | | 2/1995 | Laroia et al. | |
| 5,809,033 A | * | 9/1998 | Turner et al. ................. | 370/465 |
| 5,854,812 A | | 12/1998 | Huber et al. ................. | 375/296 |
| 6,078,695 A | * | 6/2000 | Kadono ........................ | 382/243 |
| 6,185,175 B1 | * | 2/2001 | Zook ............................ | 360/53 |

FOREIGN PATENT DOCUMENTS

| | | | | |
|---|---|---|---|---|
| DE | 4404004 | 11/1994 | ........... | H04L/25/49 |
| DE | 4407038 | 9/1995 | ........... | H04L/27/02 |
| DE | 4440947 | 4/1996 | ........... | H04L/25/49 |

OTHER PUBLICATIONS

D.G. Forney, Jr. et al., "Trellis Shaping", IEEE Trans. Inform. Theory, vol. 38, No. 2, pp. 281–300, Ma. 1992.

M. Vedat Eyuboglu, et al., "Trellis Precoding: Combined Coding, Precoding and Shaping for Intersymbol Interference Channels", IEEE Trans. Inform. Theory, vol. 38, No.2, pp. 301–314, Mar. 1992.

D.G. Forney, J.r, "The Viterbi Algorithm", Proc. IEEE vol. 61, pp. 268–278, Mar. 1973.

Robert F.H. Fischer, et al., "Dynamics Limited Precoding, Shaping, and Blind Equalization for Fast Digital Transmission Over Twisted Pair Lines", IEEE J. Select. Areas on Commun., vol. 13, No. 9, pp. 1622–1633, Dec. 1995.

A. J. Viterbi, "Error Bounds for Convolutional Codes and an Asymptotically Optimum Decoding Algorithm", IEEE Trans. Inform. Theory, vol. IT–13, pp. 260–269, Apr. 1967.

* cited by examiner

Primary Examiner—Tesfaldet Bocure
Assistant Examiner—Pankaj Kumar
(74) Attorney, Agent, or Firm—Abelman, Frayne & Schwab

(57) ABSTRACT

A method for transmitting a succession of input data samples over a channel having a given channel response includes generating a set of candidate signal point sequences responsive to the input data samples, such that the input data samples are recoverable from a final signal derived from the candidate sequences. The succession of input data samples is mapped into a succession of interim signal point sequences, selected from among the candidate signal point sequences according to a signal shaping criterion. The interim signal point sequences are precoded according to the given channel response and further according to a whitening transformation. The precoded sequences are filtered in accordance with the whitening transformation, thus generating the final signal to be transmitted over the channel to a receiver.

14 Claims, 7 Drawing Sheets

| $j$ | 0 | 1 | 2 | 3 |
|---|---|---|---|---|
| $c_2(j)$ | 0 | 0 | 1 | 1 |
| $c_1(j)$ | 0 | 1 | 1 | 0 |

| $j$ | $a1(j)$ | $a2(j)$ |
|---|---|---|
| 0 | $SYM(0)$ | $SYM(3)$ |
| 1 | $SYM(1)$ | $SYM(2)$ |
| 2 | $SYM(1)$ | $SYM(2)$ |
| 3 | $SYM(0)$ | $SYM(3)$ |
| 4 | $SYM(2)$ | $SYM(1)$ |
| 5 | $SYM(3)$ | $SYM(0)$ |
| 6 | $SYM(3)$ | $SYM(0)$ |
| 7 | $SYM(2)$ | $SYM(1)$ |
| 8 | $SYM(3)$ | $SYM(0)$ |
| 9 | $SYM(2)$ | $SYM(1)$ |
| 10 | $SYM(2)$ | $SYM(1)$ |
| 11 | $SYM(3)$ | $SYM(0)$ |
| 12 | $SYM(1)$ | $SYM(2)$ |
| 13 | $SYM(0)$ | $SYM(3)$ |
| 14 | $SYM(0)$ | $SYM(3)$ |
| 15 | $SYM(1)$ | $SYM(2)$ |

Fig. 6

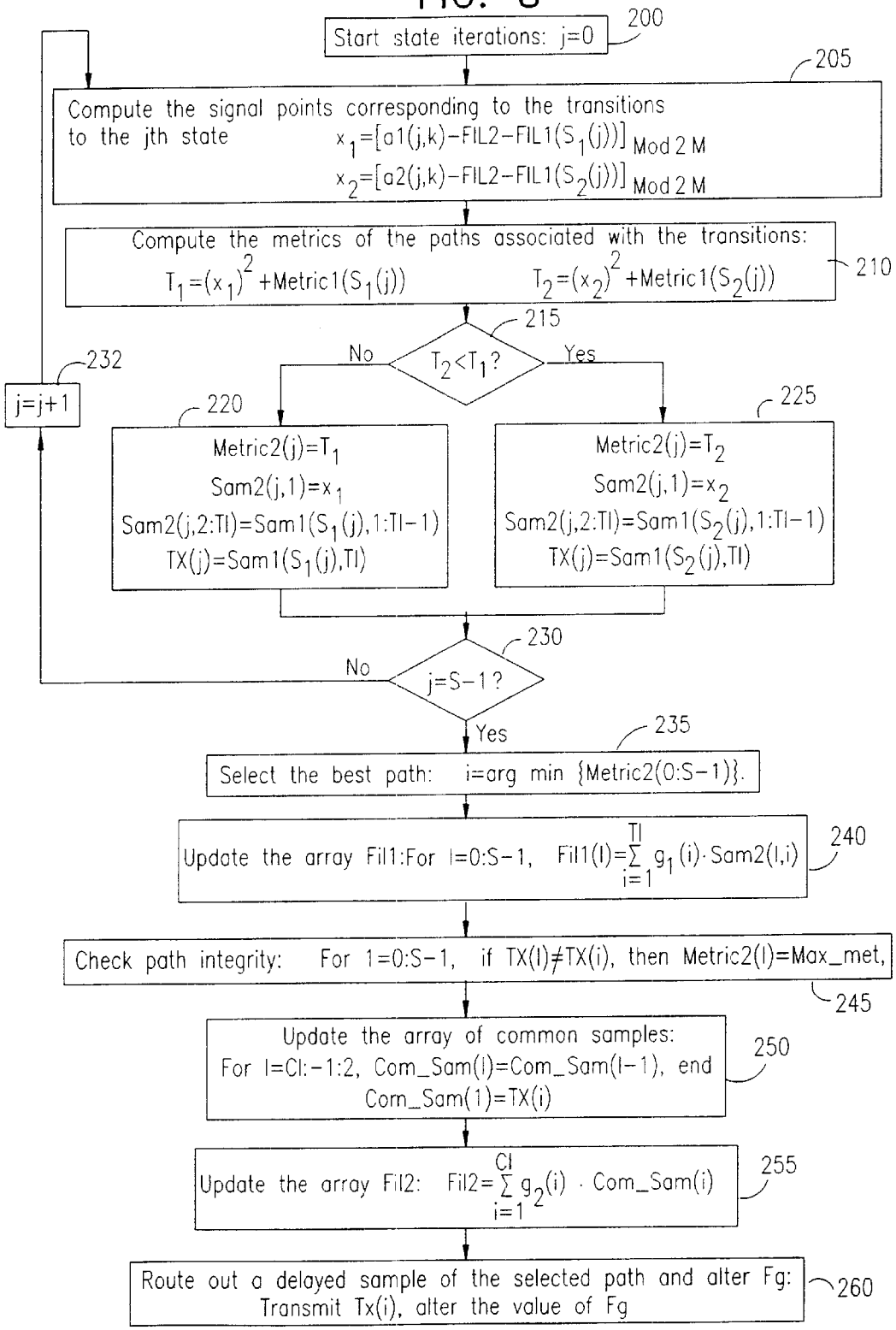

APPARATUS AND METHODS FOR COMBINED PRECODING AND SHAPING GENERATING AN UNCORRELATED SEQUENCE OF SAMPLES

FIELD OF THE INVENTION

The present invention relates to modulation systems for transmission of digital data over a channel.

BACKGROUND OF THE INVENTION

Some existing digital transmission systems incorporate precoding and shaping. Shaping is a method of selecting a signal point sequence from a subset of all allowable signal point sequences. The selection is based on the respective powers of the candidate sequences. The objective of shaping is to achieve a non-uniform, Gaussian-like distribution over an expanded constellation, so as to reduce the average signal power at the same data rate. This power reduction is called shaping gain. Trellis shaping is one of the well-known shaping techniques. In this technique, the transmitter selects a sequence by a search through the trellis diagram of a convolutional shaping code, and the set of all candidate sequences is not a simple Cartesian product of finite-dimensional regions. Trellis shaping uses an expanded signal constellation in which the symbols have a plurality of representations.

Another practicable (nonlinear) processing in digital transmission systems operating over InterSymbol Interference (ISI) channels is precoding. The precoder eliminates the need for a Decision Feedback Equalizer (DFE) at the receiver, which provides two prominent advantages. Firstly, it enables the use of coding over ISI channels in the same manner as for channels without ISI. The operation of the DFE requires zero delay decisions whereas any coding scheme entails some delay in the decision path. Thus channel coding cannot be combined with DFE in a direct way. Secondly, error propagation is ascribed to the DFE but avoided in the alternative scheme that utilizes a precoder. In this scheme, the channel response has to be known at the transmitter. There are numerous ways to combine precoding with shaping. One of these combinations is known as trellis precoding which combines trellis shaping and precoding.

It is well-known that the sequence at the output of the precoder is uncorrelated regardless of the channel response. However, when shaping is combined with precoding, then the constrained sequences may no longer be uncorrelated. A digital transmitter is usually limited to meet a required spectral mask. Consequently, the transmit spectrum may not meet the mask when the sequence at the output of the precoder is not uncorrelated, and hence no longer has a white spectrum. Furthermore, the correlation between the transmitted samples may be channel dependent.

Trellis shaping for modulation systems is described in U.S. Pat. No. 5,150,381 to Forney, Jr. et al.; in Forney "Trellis Shaping" *IEEE Trans. Inform. Theory*, vol. 38, no. 2, pp. 281–300, March 1992; and in Eyuboğlu et al. "Trellis precoding: combined coding, precoding and shaping for intersymbol interference channels," *IEEE Trans. Inform. Theory*, vol. 38, no. 2, pp. 301–314, March 1992.

Another shaping method is described in Fischer et al. "Dynamics limited precoding, shaping, and blind equalization for fast digital transmission over twisted pair lines," *IEEE J. Select. Areas on Commun.*, vol. 13, no. 9, pp. 1622–1633, December 1995.

Viterbi search methods are described in:

A. J. Viterbi, "Error bounds for convolutional codes and an asymptotically optimum decoding algorithm." *IEEE Trans. Inform. Theory* vol.IT-13, pp.260–9, April 1967; and D. G. Forney, Jr., "The Viterbi Algorithm." *Proc.* IEEE vol.61, pp.268–78, March 1973.

The disclosures of all publications mentioned in the specification and of the publications cited therein are hereby incorporated by reference.

SUMMARY OF THE INVENTION

The present invention seeks to provide a method applicable to transmitters that incorporate shaping and precoding. The method maps a data sequence to an uncorrelated signal point sequence. The method involves a modification of the coefficients of the feedback filter of the precoder and an addition of a whitening filter at the output of the precoder that compensates for the above modification. The receiver suitable to reconstruct the source data of this transmitter over the channel is the receiver used for the original transmitter without the modification and the additional filter.

There is thus provided in accordance with a preferred embodiment of the present invention a method for substantially reducing correlation between samples within a post-whitening signal point sequence generated by a transmitter employing a shaping procedure and including a precoding unit having a feedback filter operative to generate a set of candidate signal point sequences $\{x_0(z), x_1(z), \ldots, x_{S-1}(z)\}$ and an output, the transmitter being operative to transmit input data over a channel toward a receiver, the channel being characterized by a monic equivalent channel response $h(z)$, the method including using the shaping method and the precoding unit to generate the set of candidate signal point sequences $x_j(z)$, and selecting a pre-whitening signal point sequence from the set of candidate signal point sequences, for each sample of input data, wherein generation of each component of each individual candidate sequence is partly based on processing past components of the individual candidate sequence, including modifying the feedback filter of the precoding unit so that its response is $h(z)w(z)-1$ rather than $h(z)-1$, and adding a whitening filter with response $w(z)$ at the output of the precoding unit, wherein the whitening filter compensates for the modifying step such that a receiver constructed and operative to receive data from a transmitter whose precoder's feedback filter has coefficients representing the monic equivalent channel response $h(z)$, via the channel, is also able to receive data from a transmitter which performs the modifying and adding steps, via the channel.

Further in accordance with a preferred embodiment of the present invention the step of selecting an interim signal point sequence is at least partly determined by the relative powers of various candidate sequences in the set of candidate sequences.

Still further in accordance with a preferred embodiment of the present invention the set of candidate point sequences is associated with a finite state trellis diagram and the selecting step includes a search through the trellis diagram.

Additionally in accordance with a preferred embodiment of the present invention the selecting step includes a Viterbi-algorithm type search.

Also in accordance with a preferred embodiment of the present invention the selecting step is also operative to reduce the peak power required to transmit the post-whitening signal point sequence.

Further in accordance with a preferred embodiment of the present invention the pre-whitening signal point sequence is selected by the shaping algorithm, for each sample of input data, such that the input data is recoverable at the receiving end of the channel.

Still further in accordance with a preferred embodiment of the present invention at least the step of modifying coefficients of the feedback filter of the precoding unit is determined in a preliminary adaptation stage in which the transmitter starts operating in a state wherein the response of the feedback filter of its preceding unit is h(z)−1.

Additionally in accordance with a preferred embodiment of the present invention the adaptation stage includes a least mean squares adaptation.

Further in accordance with a preferred embodiment of the present invention the whitening filter includes a Finite Impulse Response (FIR) filter.

Still further in accordance with a preferred embodiment of the present invention the whitening filter includes an Infinite Impulse Response (IIR) filter.

Additionally in accordance with a preferred embodiment of the present invention the preceding unit includes an array of parallel precoders.

Further in accordance with a preferred embodiment of the present invention the step of selecting a pre-whitening signal point sequence is operative to reduce the peak power of the pre-whitening signal point sequence.

There is also provided in accordance with another preferred embodiment of the present invention apparatus for substantially reducing correlation between samples within a post-whitening signal point sequence, the apparatus including a transmitter operative to transmit input data over a channel toward a receiver, the channel being characterized by a monic equivalent channel response h(z), the transmitter including a shaping unit operative to select a pre-whitening signal point sequence from a set of candidate signal point sequences, for each sample of input data, and a precoding unit operative to generate the set of candidate signal point sequences $x_j(z)$ wherein generation of each component of each individual candidate sequence is partly based on processing past components of the individual candidate sequence, the precoding unit including a feedback filter, whose coefficients represent the response h(z)w(z)−1, an output, and a whitening filter with response w(z) at the output of the precoding unit, wherein the whitening filter is operative to compensate for the w(z) factor in the feedback filter, and a receiver, constructed and operative to receive data from the transmitter whose precoder's feedback filter has coefficients representing the response h(z)−1, via the channel, is also operative to receive data from a transmitter which includes the preceding units, via the channel.

Further in accordance with a preferred embodiment of the present invention the response w(z) of the whitening filter is set such that the samples at the output of the whitening filter are practically uncorellated.

BRIEF DESCRIPTION OF THE DRAWINGS

The present invention will be understood and appreciated from the following detailed description, taken in conjunction with the drawings in which:

FIG. 6 is a table showing an Output Matrix for a $4^{th}$ order convolutional code;

FIG. 8 is a flow chart illustrating a preferred method performed by the Iteration Computation Unit of FIG. 3.

DETAILED DESCRIPTION OF PREFERRED EMBODIMENTS

The present invention is useful in conjunction with prior art transmission systems that combine preceding and shaping. Precoding at the transmitter side is a prevalent method for transmission over ISI channels. Coding techniques can be applied to systems that comprise a precoder as for ISI free channels. The present invention combines preceding, a nonlinear processing employing modulo arithmetic, with a Pulse Amplitude Modulation (PAM) signal constellation, i.e. a signal set of M equally spaced levels A={±1,±3, . . . , ±(M−1)}, and preferred embodiments of the invention are described hereinbelow.

Figure 1:
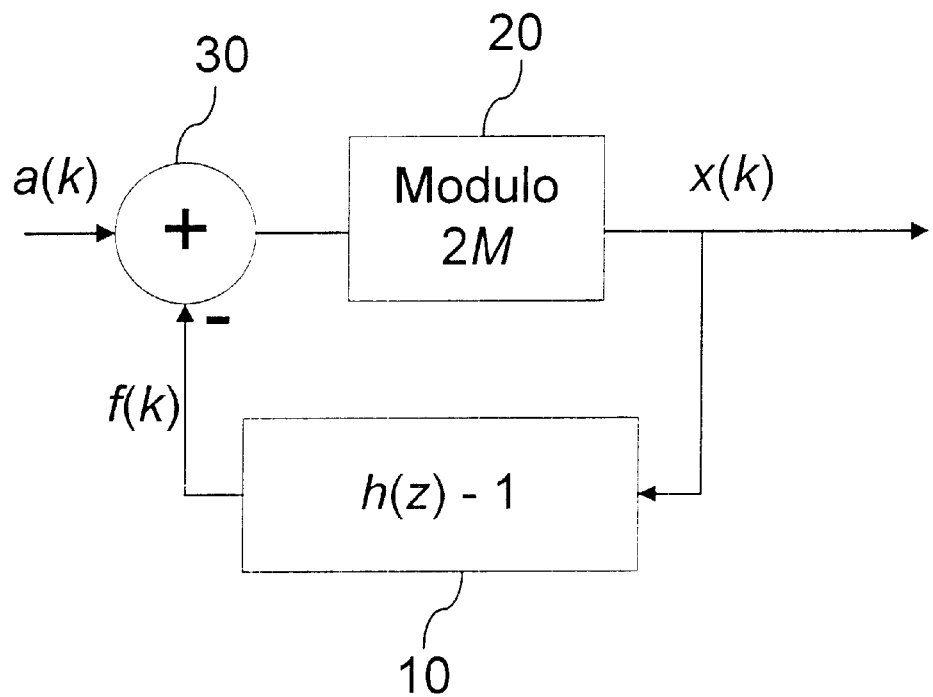
FIG. 1 is a simplified block diagram of a precoder as known in the prior art.

A prior art precoder is depicted in FIG. 1.

h(z) denotes the discrete-time monic equivalent channel response, that is, h(z) can be described as follows:

$$h(z)=1+h_1z^{-1}+h_2z^{-2}+ \ldots +h_Nz^{-N},$$

where h(z) denotes the z- transform of the sequence $\{h_j, j=1,2,\ldots,N\}$, and z is a complex delay variable corresponding to processing rate of the system. N denotes the length of the precoding filter h(z), and h(z) is assumed to be known at the transmitter. The symbols generated by the transmitter a(k) are taken from the signal set A. The transmitted sample x(k) is determined as $$x(k) = a(k) - \sum_{j=1}^{N} h_j x(k-j) + 2M \cdot b(k), \quad (1)$$

where the integer b(k) is determined such that x(k) takes on a value in the range [−M,M). The equivalent z-transformation of this formula is:

$$x(z)h(z)=a(z)+2M \cdot b(z),$$

The equivalent discrete-time received sequence r(z) is hence $$r(z)=x(z)h(z)+n(z)=a(z)+2M \cdot b(z)+n(z),$$

where n(z) denotes the samples of the received noise. This received sequence is detected symbol-by-symbol by a delay-free detector. An estimate of the transmitted symbol â(k) may be retrieved from r(k) by a modulo 2M operation (20), which reduces its value to the range [−M, M). A key property of the transmitted signal is that if a(z) is an independent, identically distributed sequence uniformly distributed over [−M,M), then so is the sequence x(z), regardless of the channel response h(z).

When precoding is combined with shaping the transmitter maintains several candidate sequences of symbols $a_i(z)$ and related output samples $x_i(z)$, where i denotes the index of the sequence among all the candidate sequences. At each symbol iteration the transmitter chooses a winner sequence, and transmits a sample $x_i(k)$ from this sequence. The search method compares the energy of the different candidate sequences. There are different shaping methods which may be combined with precoding. Some of these methods result in a correlated (transmitted) sequence. This correlation may depend on the channel response h(z). In this case, the transmit spectrum is no longer determined solely by the filter that processes the sequence x(k) generated by the precoder and the shaping method.

Figure 2:
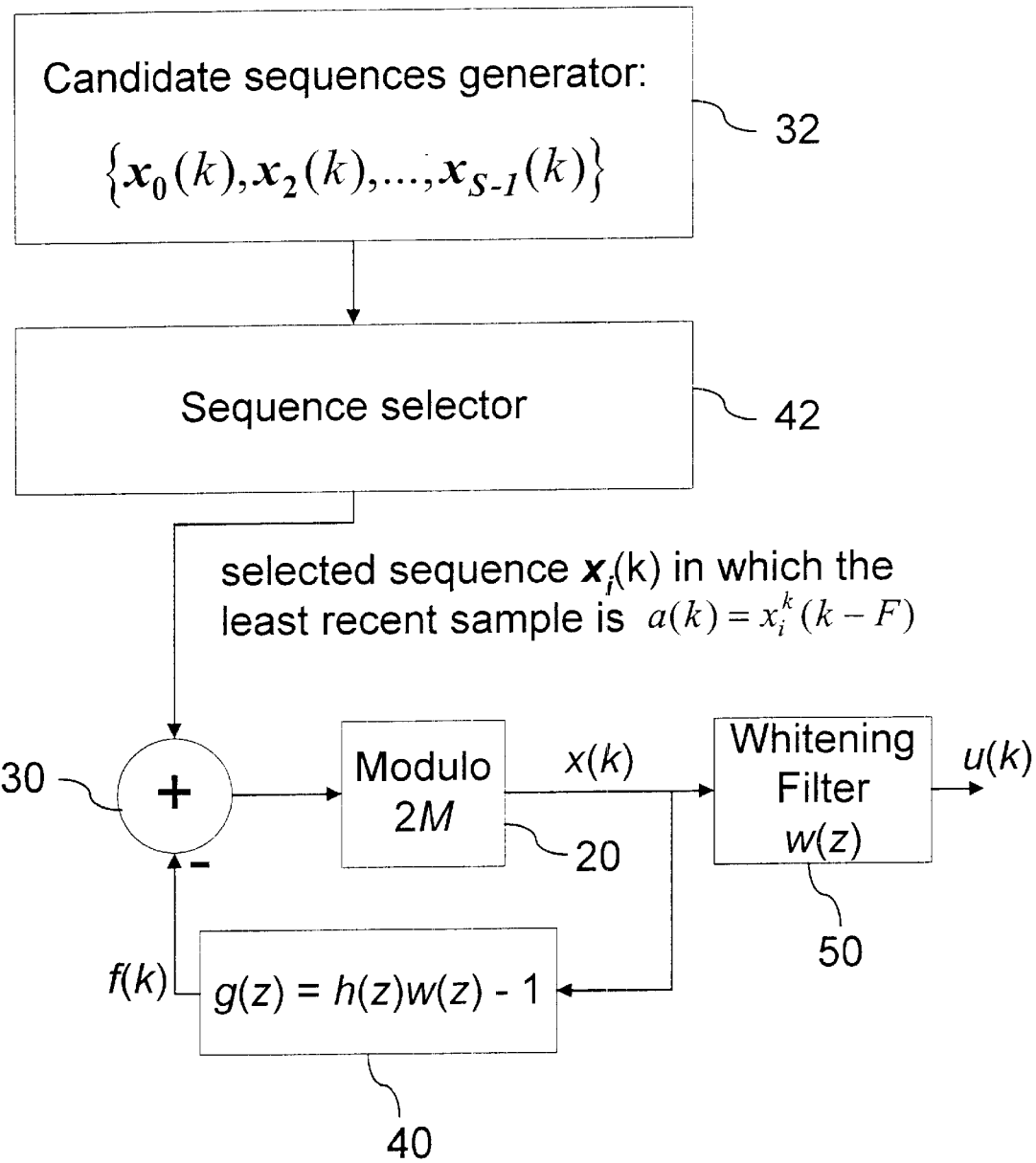
FIG. 2 is a simplified top level block diagram of a whitening precoder constructed and operative in accordance with a preferred embodiment of the present invention.

FIG. 2 is a simplified top level block diagram of a whitening precoder constructed and operative in accordance with a preferred embodiment of the present invention. A transmitter that incorporates a shaping algorithm and uses this modified precoder (instead of the conventional, prior art, one) generates samples which are practically uncorrelated and hence unravels the correlation between the generated samples. A preferred embodiment of this invention incorporates a Whitening Filter (50) and a modified precoder. These modules substantially unravel the correlation between the samples of the sequence x(z). The scheme permits any type of shaping and is compatible with coding and can be combined with trellis-coded modulation. As shown in FIG. 2, the input sequence of symbols is typically generated by a candidate sequences generator (32) and selected by a sequence selector (42) according to some suitable selection criteria. The generation of a plurality of candidate sequences, and the selection of a winner one, represent the shaping method.

The Whitening Filter (50) is added at the output of the modified precoder, and its impact is compensated for by using a filter (40) and by the existing nonlinear modulo operation (20). w(z) denotes the z-transform of the filter that generates a sequence with white spectrum when it processes the sequence x(z). The frequency response w(z) of the filter (40) is the square root of the inverse of the spectrum of the shaped sequence x(z).

The modified precoder of FIG. 2 is preferably used with an M-point PAM constellation which accounts for the expansion preferably employed by the shaping method. The input sequence a(k) takes on these values. w(z) denotes the transfer function of the Finite Impulse Response (FIR) Whitening Filter (50). That is, $$w(z)=1+w_1z^{-1}+w_2z^{-2}+\ldots+w_Kz^{-K},$$

and K denotes the length of the Whitening Filter (50).

According to the above scheme:

$$x(z) = \frac{[a(z) + 2M \cdot b(z)]}{h(z)w(z)},$$

where b(z) denotes the sequence of the unique integers such that $$x(k) = a(k) + 2M \cdot b(k) - \sum_{j=1}^{L} g_j x(k - j), \quad (2)$$

is in the interval [−M,M), and $$g_j = \sum_{m=0}^{\min(j,k)} w_m h_{j-m},$$

with the convention that $w_o=h_o=1$

According to the above notation, L=K+N.

This notation corresponds to the combination of the original feedback filter h(z) and the whitening filter (50) to a single filter g(z). However, other equivalent implementations that include the concatenation of the two filters rather than joining them to a single one are also possible.

The sequence at the output of the whitening precoder is given by $$u(z) = \frac{[a(z) + 2M \cdot b(z)]}{h(z)}$$

and the received signal is, $$r(z)=u(z)h(z)+n(z)=a(z)+2M \cdot b(z)+n(z),$$

where n(z) denotes the samples of the received noise. The received signal is identical to the sequence received in the absence of the proposed modifications, (i.e. FIG. 1), though the transmitted sequences are dissimilar, since the sequence of integers b(k) in Eq. (1) and (2) are different.

A key advantage of the present invention over prior art is that the transmitted sequence is practically uncorrelated, and hence the transmitted spectrum is not channel dependent. Also, the proposed method hardly degrades the shaping gain of the system.

The combination of precoding and shaping incorporates a set of S parallel whitening precoders. At each symbol iteration k, these precoders are fed with the appropriate current symbol a(i,k), i=0,1, . . . ,S−1, and with sequences of the corresponding past sequences $x_i(k)$, i=0,1, . . . , S−1, where $$x_i(k)=\{x_i^k(k-1),x_i^k(k-2),\ldots,x_i^k(k-J)\}$$

The output $x_i^k(k)$ of the ith precoder at time instant k is thus given by $$x_i^k(k) = a(i, k) + 2M \cdot b_i(k) - \sum_{j=1}^{L} g_j x_i^k(k - j),$$

where the sequence $b_i(k)$ is determined by the operation of the modulo device of the ith precoder. Also, the notation $x_i^k(k-j)$ accounts for the fact that at each symbol iteration an entire sequence of samples is fed to each precoder and not just a single sample.

The shaping functionality chooses at each symbol iteration a winner sequence $x_i(k)$, and routes one sample of this sequence with a predetermined delay to the output x(k−F), such that the sequence of chosen samples {x(k), x(k−1), . . . ,} is an allowable sequence. That is, the input data a(k) is recoverable at the receiver from this sequence. Typically F=J, i.e. the least recent sample of the selected sequence is routed out.

Figure 3:
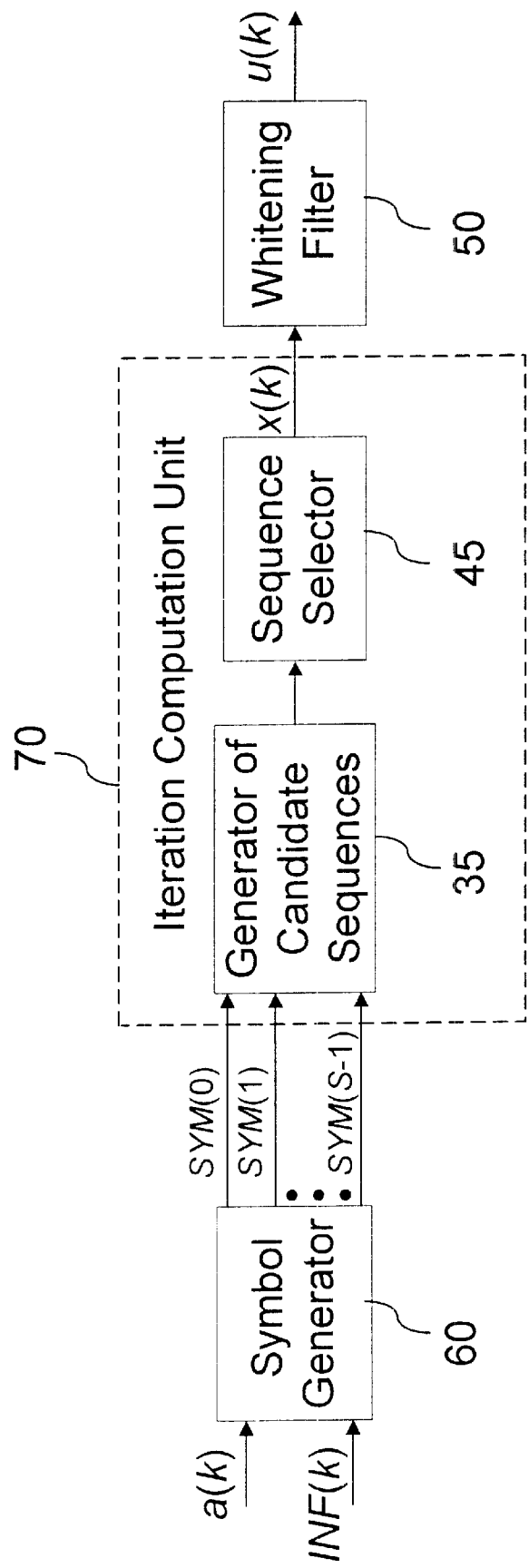
FIG. 3 is a simplified top level block diagram of a system implementing shaping and whitening preceding, constructed and operative in accordance with a preferred embodiment of the present invention.

FIG. 3 is a simplified top level block diagram of a system implementing shaping and whitening precoding, constructed and operative in accordance with a preferred embodiment of the present invention;

As shown, the present invention preferably comprises three subunits:

a Whitening Filter (50), a Symbol Generator (60) and an Iteration Computation Unit (70). The Iteration Computation Unit (70), typically comprising a generator of candidate sequences (35) and a sequence selector (45), accomplishes the majority of the precoding process, and of the shaping functionality, typically involving generation of several candidate sequences and selection of a winning one.

The Symbol Generator (60) performs a precomputation to generate the samples that feed the generator of candidate sequences (35) of the Iteration Computation Unit (70). This generator (60) gets at its input a symbol a(k) and an optional information bit INF(k). The symbol a(k) is preferably generated by a PAM Mapper, and this symbol represents coded or uncoded information bits. The Symbol Generator (60) uses symbol a(k) and the optional information bit INF(k) to generate a plurality of symbols denoted by {SYM(0), SYM(1), . . . , SYM(S−1)}. These symbols are determined in accordance with the shaping method implemented. Also, the additional information bit may not be employed in some of the shaping methods. For example, two such methods may be found in Eyuboğlu et al. ("Trellis precoding: combined coding, precoding and shaping for intersymbol interference channels," *IEEE Trans. Inform. Theory*, vol. 38, no. 2, pp. 301–314, March 1992) and in Fischer et al. ("Dynamics limited precoding, shaping, and blind equalization for fast digital transmission over twisted pair lines," *IEEE J. Select. Areas on Commun.*, vol. 13, no. 9, pp. 1622–1633, December 1995). The former method is also known as trellis precoding.

The shaping method suggested by Forney and by Eyuboğlu et al. utilizes a lattice-type coset code. It is based on a convolutional shaping code which defines the candidate symbol codewords. This code is used to encode the information bit INF(k). In this method, the range of the input symbol a(k) may be set to one fourth of the entire range of the symbols at the output of the Symbol Generator (60). The generator operates as follows. At each iteration, the information bit INF(k) is converted to a mathematically two-bit coset representative t(k). In particular, one of the bits of this bit pair may be set to zero. The sequence t(D) is generated by the n×(n−k) (right) inverse syndrome former matrix $[H(D)]^{-1}$, where H(D) is the (n−k)×n parity-check matrix of the underlying shaping code whose rate is k/n. Clearly, $H(D) \cdot [H(D)]^{-1} = I_{(n-k)}$, where $I_{(n-k)}$ denotes the (n−k)×(n−k) identity matrix. This inverse syndrome matrix is not unique, however, its choice also determines the parity-check matrix to be used at the receiver in order to recover the original bit sequence.

The syndrome of the sum of the sequence t(D) and any of the codewords of the shaping code is the information sequence INF(D). That is, $$H(D) \cdot [t(D) \oplus c_s(D)] = INF(D),$$

where $c_s(D)$ is a sequence of the shaping code, and the notation $\oplus$ stands for an Exclusive OR operation.

For example, a rate-1/2 binary code can be used. Let $G(D) = [g_1(D), g_2(D)]$ be a generator matrix of the shaping code, where $g_1(D)$ and $g_2(D)$ are polynomials of D. The degree of these polynomials determines the number of states of the convolutional code. A corresponding parity-check matrix is $H(D) = [g_2(D), g_1(D)]$, and a corresponding inverse syndrome former matrix is $$[H(D)]^{-1} = [1/g_2(D), 0]^T, \text{ and } t(D) \text{ is set to } INF(D) \cdot [1/g_2(D), 0]^T.$$

In the trellis diagram of this code, there are two edges branching from each state, and also two edges branch into each trellis state.

The inverse syndrome former matrix may be implemented as an Infinite Impulse Response (IIR) "binary filter". This matrix produces one output bit t(k) per each input bit INF(k). That is, if $g_2(D) = 1 + g_{21} \cdot D + g_{22} \cdot D^2 + \ldots + g_{2G} \cdot D^G$, where each $g_{2j}$ is a binary entry, j=1,2, . . . ,G, then the output bit at time instant k t(k) is generated according to the following formula:

$$t(k) = [t_1(k), t_2(k)]^T = [INF(k) \oplus [g_{21} \otimes t(k-1)] \oplus [g_{22} \otimes t(k-2)] \oplus \ldots \oplus [g_{2G} \otimes t(k-G)], 0]^T$$

where T denotes the transpose matrix, and the notation $\otimes$ stands for the bitwise AND operation. The bit pair t(k) is "scrambled" with the output bits of every trellis transition determined by the shaping code.

The bit-pair t(k) is used to generate a plurality of symbols at the output of the Symbol Generator (60). The following is an example of a conversion of the input symbol a(k) and an input bit INF(k) to a plurality of symbols {SYM(0),SYM(1), SYM(S−1)}. A linear trellis code can be fully characterized by two matrices: the transition matrix that describes the possible state transitions, and the output matrix that depicts the symbols corresponding to these transitions. For a rate-1/2 code, each such symbol is a bit-pair. There are four combinations of bit pairs, and hence in this implementation, the Symbol Generator (60) generates four distinct symbols. In order to generate these symbols, the sequence t(k) is first used to generate a second sequence $d(j,k) = [d_1(j,k), d_2(j,k)]^T$, and an integer j, $0 \leq j \leq 3$ is mapped to a bit pair c(j) as shown in FIG. 4.

Figures 4, 5:
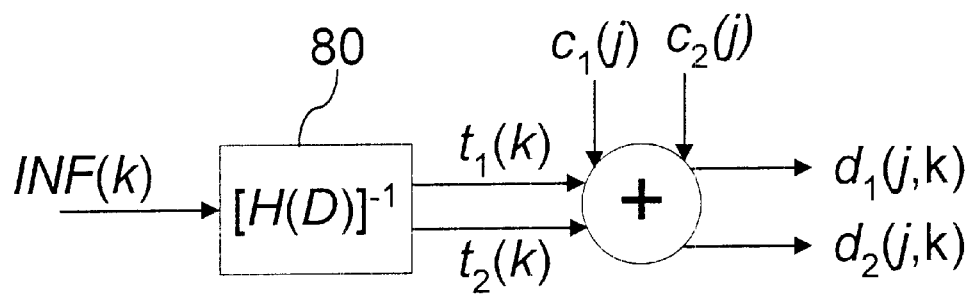
FIG. 4 is a table showing index to bit-pair mapping.
FIG. 5 is a simplified illustration of the scrambling operation of the Symbol Generator of FIG. 3, constructed and operative in accordance with a preferred embodiment of the present invention.

The sequence d(j,k) is generated by the following bit operations:

$$d(j,k) = t(k) \oplus c(j) = [t_1(k) \oplus c_1(j), t_2(k) \oplus c_2(j)]^T$$

and FIG. 5, which is a simplified illustration of the scrambling operation of the Symbol Generator (60) of FIG. 3, constructed and operative in accordance with a preferred embodiment of the present invention, illustrates this equation.

The set of output symbols is generated using the input symbol and the bit-pair d(j,k), e.g. if the output symbols range over [−M,M), and the input symbol takes on values in the range [−M,−M/2), then the Symbol Generator (60) preferably provides four distinct symbols SYM(0), SYM(1), SYM(2) and SYM(3), where $$SYM(j) = M/2 \cdot \{2d_1(j,k) + d_2(j,k)\} + a(k).$$

The mapping depicted in the above formula represents the constellation expansion. The range of the symbols at the output of the generator is four times larger than the range of the symbols at its input. The following is an example of a shaping code and of the induced processing. The octal representation of the generators of the proposed code is (23,35), i.e., the generator matrix G(D) of the code is given by $[1+D+D^4, 1+D^2+D^3+D^4]$, and the free distance of the code is 7. The corresponding inverse syndrome former matrix is $H^T(D) = [1/(1+D^2+D^3+D^4)0]$. Consequently, at the receiver, the syndrome bit may be recovered by decoding the estimate of t(D) by the parity-check matrix $H^1(D) = [1+D^2+D^3+D^4 1+D+D^4]^T$. The bit-pair t(D) is generated at the transmitter as follows:

$$t(k) = [t_1(k), t_2(k)]^T = [INF \oplus t(k-2) \oplus t(k-3) \oplus t(k-4), 0]^T.$$

Alternatively, the shaping method of Fischer et al. may be employed. A preferred embodiment of the invention that uses this method involves a Symbol Generator (60). This shaping method operates on a virtual trellis code. In order to implement this method, input symbols in the range of [−M/2,M/2) at the input of the Symbol Generator (60) may be used. These values are preferably assigned by the PAM mapper to the information bits at its input. This generator provides two symbols in the range of [−M,M). The two symbols are:

$SYM(0)=a(k)$, $SYM(1)=[M+a(k)]$ modulo $2M$, where [M+a(k)] modulo 2M represents the value [M+a(k)]+ 2M·m, such that m is the unique integer for which [M+a(k)]+2M·m fall in the range [−M,M).

The Whitening Filter (50) may be implemented as an FIR filter. This filter processes the sequence x(k) provided by the Iteration Computation Unit (70). Without loss of generality, the first coefficient of this filter may be set to 1. The filter generates the sequence u(k), which is given by $$u(k) = x(k) + \sum_{j=1}^{K} w_j x(k-j).$$

The coefficients of the filter are chosen such that the output sequence is practically uncorrelated.

The following is an example of a method that computes a suitable Whitening Filter (50). A suitable filter is not known a priori and depends on the channel response and on the shaping method, and these coefficients are determined in the acquisition stage. During this stage the coefficients are all set to zeros, and hence the filter first generates the output sequence u(k)=x(k). During this stage, the coefficients of the filter are adapted, e.g., the coefficients of the Whitening Filter (50) may be determined by a least mean squares (LMS) adaptation. Due to the operation of the system during the acquisition stage, the precoder output x(k) is a colored (correlated) sequence, and the Whitening Filter is determined by an LMS adaptation that minimizes the cost function:

$$\min |u(k)|^2 = \left| x(k) + \sum_{j=1}^{K} w_j x(k-j) \right|^2$$

Consequently, the adaptation rule is:

$w_j \leftarrow w_j - \mu \cdot u(k) \cdot x(k-j)$, where $\mu$ is the adaptation constant.

At the end of the acquisition stage, the feedback filters used for precoding in the Iteration Computation Unit (70) should be modified in order to compensate for the impact of this filter. A suitable modification is as follows. The coefficients of the feedback filter used for precoding in the Iteration Computation Unit (70) {$h_j$, j=1,2, . . . ,N} are convolved with the coefficients of the Whitening Filter (50) and the resulting new coefficients are denoted by $g_j$:

$$g_j = \sum_{m=0}^{\min(j,k)} w_m h_{j-m}, \; 1 \le j \le L$$

Alternatively, the feedback filter may be a cascade of two filters: the filter that accounts for the impulse response of the channel and a compensation filter. This modification preferably guarantees that the receiver suitable to reconstruct the source data of this transmitter over the channel may be the receiver used for the original transmitter without the modification and the additional filter.

The Iteration Computation Unit (70) carries out the shaping method and the preceding, and a detailed description of the shaping method is provided hereinbelow. The Iteration Computation Unit (70) generates a plurality of candidate sequences, and selects a winner sequence. The selection is based on the respective average powers of the candidate sequences (sum of square values of the samples). The search method operates on the sequence x(D) rather than the final sequence u(D) for two reasons. Firstly, this operation ensures that the final sequence u(D) is almost uncorrelated, since that the Whitening Filter (50) is designed to whiten the sequence x(D) generated by the precoder. Secondly, it is assumed that the Whitening Filter (50) does not have a significant impact on the performance of the method.

There are numerous search methods that implement different shaping methods. A preferred embodiment of the present invention preferably incorporates a shaping method that involves a trellis code which defines the legal sequences. Hence the search has an equivalent definition by two matrices: a transition matrix and an output matrix.

It may be assumed that the edges of the diagram have binary labels, and that each trellis state is connected to two states in the previous (and also the subsequent) level. Consequently, if the diagram comprises S states, then each section of the trellis comprises 2S edges. The transition matrix comprises the information as to which states are branching to each trellis state. The output matrix lists the labels (outputs) of the corresponding edges, a1(j) and a2(j), associated with the transition to the jth state, and it is thus code dependent. The output matrix describes which one of the symbols generated by the Symbol Generator (60) {SYM(0), SYM(1), . . . , SYM(S−1)} corresponds to the transition described by the matrix.

The current values of these samples at time instant k, is denoted by a1(j,k) and a2(j,k). Both the transition matrix and the output matrix are typically S×2 matrices, and the indices of the trellis states are denoted here onwards as {0,1, . . . , S−1}. Any convolutional code used for trellis precoding (as described in the above-referenced Eyuboğlu et al. article), and the shaping method proposed by Fischer et al. (in the above referenced article) may be operated on a trellis with the following indexing convention: the indices of the states branching into the jth state are 2·(j mod S/2) and 2·(j mod S/2)+1, where S is an integral power of 2. When the method of Fischer et al. is implemented, the entries of the first S/2 rows of the output matrix can be set to SYM(0), and the entries of the remaining entries are all SYM(1). The entries of the output matrix that correspond to the shaping method of Eyuboğlu et al. are code dependent. FIG. 6 is a table showing an output matrix for a $4^{th}$ order convolutional code whose generator matrix $[1+D+D^4, 1+D^2+D^3+D^4]$ was given above.

Figure 7:
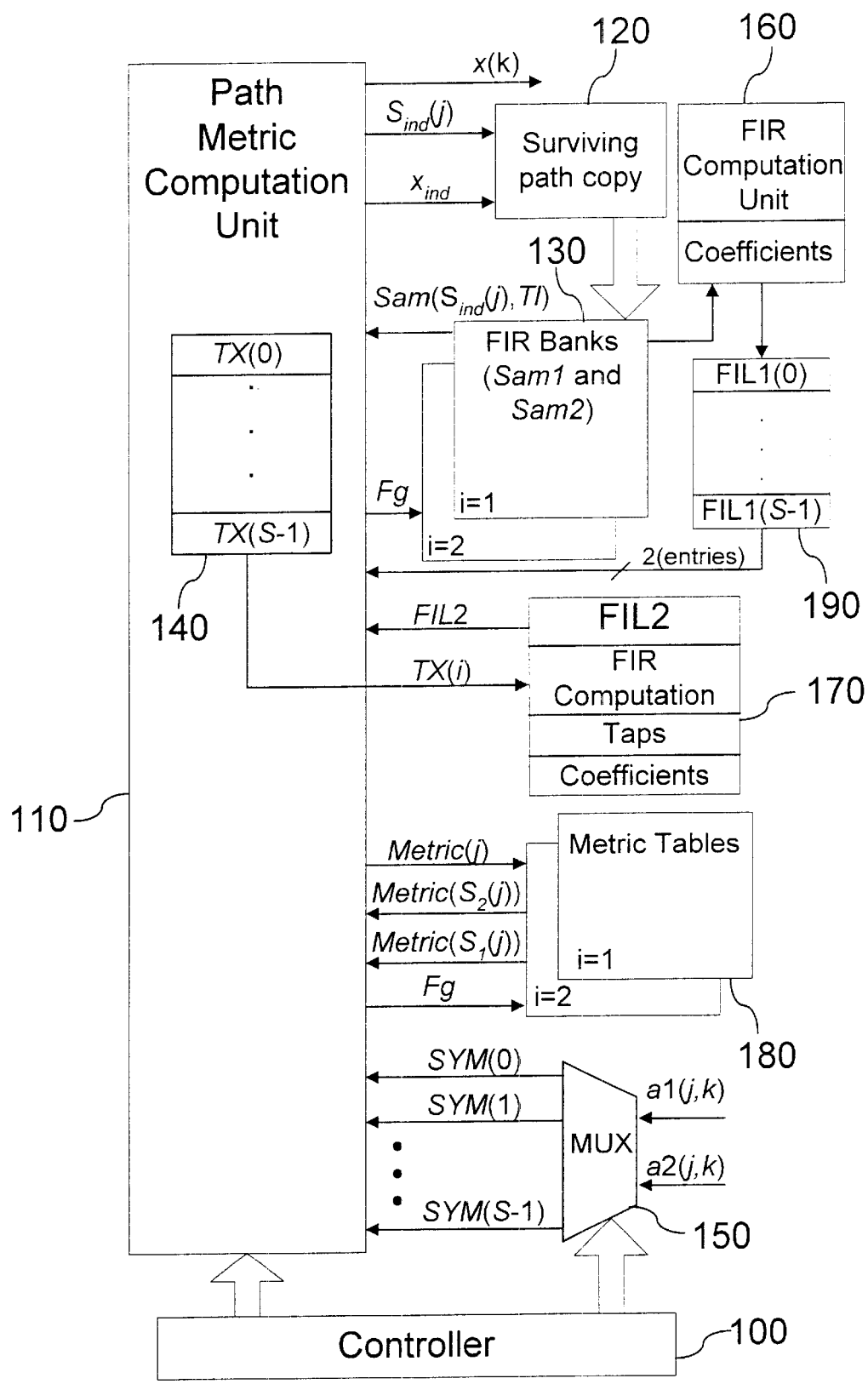
FIG. 7 is a general block diagram of the Iteration Computation Unit of FIG. 3, constructed and operative in accordance with a preferred embodiment of the present invention.

FIG. 7 is a general block diagram of the Iteration Computation Unit (70) of FIG. 3, constructed and operative in accordance with a preferred embodiment of the present invention, and which portrays the data routing between the different subunits of this machine. Throughout the description hereinbelow two periods called "symbol iteration" and "state iteration" are distinguished. Each symbol iteration consists of S state iterations and a final decision. In each of the state iterations, the method decides on the best path that terminates at one of the trellis states. At the end of all the S state iterations the method chooses the tentative best path among the S previously chosen surviving paths.

Notation

In the sequel, the following notation is employed:

S—Total number of trellis states.

Tl—The trace back depth: the total number of recent samples saved for each candidate sequence and used to estimate the average power and the peak-to-average ratio associated with each of the sequences. This estimation is used to select one sequence for transmission. This number may also determine the delay of the decision made by the shaping method.

Dl—Total number of taps of the precoding filter.

Also Cl=Dl−Tl, provided that Dl>Tl.

a1(j,k) and a2(j,k) denote the two symbols generated by the Symbol Generator and correspond to the two branches that enter the jth trellis state at time instant k. Both a1(j,k) and a2(j,k) take on values of the symbol set generated by the Symbol Generator (60): {SYM(0),SYM(1), . . . ,SYM(S−1)}.

$S_1(j)$, and $S_2(j)$ denote the indices of the two trellis states that branch into the jth trellis state.

The method utilizes the following arrays:

Metric1(0:S−1), Metric2(0:S−1)—two S-element arrays that store the aggregate state metrics which represent the relative average powers of the different sequences.

The iteration process described hereinbelow incorporates both precoding and shaping. The preceding process requires the filtering of past samples. The use of shaping involves the generation of a plurality of sequences, and thus this filtering operation is preferably repeated for all candidate sequences. Filter arrays of length Tl are preferably used to accommodate these samples.

Sam1(0:S−1,1:Tl), Sam2(0:S−1,1:Tl)—Two-dimensional arrays (for convenience). Each row in these arrays stores the trace-back sequence $x_j(k)$ that corresponds to one trellis state.

The updated metric memory at the end of each iteration uses some of the entries of the old buffers, and hence this operation entails the use of two metric buffers and a double sample array. Along the computation process the value of the flag Fg is altered. This flag designates whether the updated data is stored in Metric1 and Sam1 or in Metric2 and Sam2. When the trace back depth is smaller than the precoder length, i.e., Tl<Dl, then a portion of the preceding operation is common to all the candidate sequences, and a second portion is distinct. In this case, a second buffer Com_Sam (1:Cl) is preferably used to store the common samples.

Com_Sam(1:Cl)—A one-dimensional array that accommodates the output samples {x(k)} common to all the "surviving paths" (candidate sequences). This sequence of samples comprises all the samples generated by the Iteration Computation Unit (70) already chosen as part of winner sequences. Consequently, the delay of all these samples is larger than Tl and not larger than Dl: The array Com_Sam stores the following samples: {x(k−Tl−1), x(k−Tl−2), . . . , x(k−Dl)}. These samples have already been selecte for transmission and they are preferably employed to compute a portion of the output of the feedback filter g(z).

TX(0:S−1)—A buffer whose jth entry is the sample to be chosen and routed out provided that the jth trellis state has the smallest metric, that is, at time instant k $$TX(j) = x_j^k(k-Tl).$$

g(1:Cl)—The precoder filter. This filter accounts for the channel response and the Whitening Filter (50) response. For convenience this filter is split into two parts as follows:

$g_1$(1:Tl)—The first Tl coefficients of the filter that multiply the state-dependent samples.

$g_2$(1:Cl)—The last Cl coefficients of the precoder filter g(z).

Fil1(0:S−1)—The result at the output of the filter $g_1$ when it processes the samples stored at Sam1(0:S−1,1:Tl) or Sam2(0:S−1,1:Tl). Explicitly, $$Fil1(j) = \sum_{i=1}^{Tl} g_1(i) \cdot Sam2(j, i).$$

The above computation corresponds to Fg=1. When Fg is set to zero then the computation is carried out with the array Sam1.

Fil2—The result at the output of the filter $g_2$ when it processes the samples stored at Com_Sam:

$$Fil2(j) = \sum_{i=1}^{Cl} g_2(i) \cdot \text{Com\_Sam}(i).$$

Detailed Description of the Different Subcomputations

The method detailed hereinbelow performs two types of selections.

1. For each state iteration it determines the preferred path terminating at this state, henceforth referred to as the winner path.

2. At each symbol iteration it compares all S paths and accomplishes the final decision on a "selected path".

Fil2 and Com_Sam (170)—The common portion of the precoding process. The buffer Com_Sam accommodates the samples that are common to all the candidate sequences. Thus the operations carried out by this subunit, as opposed to the others, are carried out once per each symbol iteration.

$$Fil2 = \sum_{i=1}^{Cl} g_2(i) \cdot \text{Com\_Sam}(i)$$

Likewise at the end of each symbol iteration, the new sample to be stored is conveyed by the Path Metric Computation Unit (110). This new sample supersedes the least recent sample stored by the filter and the samples are typically reordered in order to support a correct FIR computation at the next symbol iteration:

For l=Cl:−1:2,

Com_Sam(l)=Com_Sam(l−1), end

Com_Sam(1)=TX(i), where TX(i) is the sample that belongs to the selected path chosen at the end of all the state iterations.

Surviving path copy (120)—The search method preferably requires the construction of the new sample sequences at the end of each symbol iteration. The new paths are generated by appending a new sample to an existing sequence of samples and omitting the least recent sample. However, the use of the surviving path for computation inhibits the use of a single memory. Thus at the end of each state iteration a Tl-element sequence is copied from the old FIR Bank (130) to the new one. The following assignments account for this copying:
If Fg=1, then $$Sam2(j,1)=x_{ind}, Sam2(j,2:Tl)=Sam1(S_{ind}(j),1:Tl-1)$$

Else, $$Sam1(j,1)=x_{ind}, Sam1(j,2:Tl)=Sam2(S_{ind}(j),1:Tl-1),$$

where ind is either 1 or 2 and it represents the (local) selection of one of the two paths terminating at state j as detailed below.

The FIR Sample Banks (130), FIR Computation Unit (160), and FIL1 Memory (190)—The FIR Sample Banks (130) are two arrays that store the samples corresponding to all the candidate sequences. Each such sequence is associated with a trellis path retained by the method. These samples are the most recent samples processed by the precoding filter. Consequently the computation of this portion of the FIR is path (state)-dependent, and S FIR computations are accomplished per each symbol iteration. These computations are accomplished by the FIR Computation Unit (160), and stored at the FIL1 memory (190) prior to each new symbol iteration. The Path Metric Computation Unit (110) reads two entries of the FIL1 memory (190) each state iteration. Thus at each state iteration one new FIR computation is performed. The result is used at the next symbol iteration.

If $Fg = 1$, then $Fil1(j) = \sum_{i=1}^{Tl} g_1(i) \cdot Sam2(j,i).$

Else, $Fil1(j) = \sum_{i=1}^{Tl} g_1(i) \cdot Sam1(j,i)$

The indication Fg is supplied by the Path Metric Computation Unit (110), and it determines which one of the two banks should be used at the current symbol iteration. All FIR computations are carried out with the same set of coefficients but with different sample sequences. The most recent samples stored at the FIR Banks (130) are preferably accessible by the Path Metric Computation Unit (110). At the jth state iteration, associated with the jth trellis state, two entries of the FIL1 memory (190) whose indices are $S_1(j)$ and $S_2(j)$ are read by the Path Metric Computation Unit (110).
If Fg=1, then $$TX(j)=Sam1(S_{ind}(j),Tl)$$

Else, $$TX(j)=Sam2(S_{ind}(j),Tl),$$

where ind is set to 1 or 2, according to the (local) decision carried out by the method detailed hereinbelow.

Metric Tables (180)—The metric tables govern the decisions made by the search method. The table of metrics of the existing paths is used to generate the metrics of the new paths. One new metric is generated each state iteration. Two metrics of the (previous) states branching into the state under computation are read by the Path Metric Computation Unit (110) during the run of a state iteration: Metric($S_1(j)$) and Metric($S_2(j)$), where j denotes the index of the state checked at the current iteration.

The Path Metric Computation Unit (110)—The Path Metric Computation Unit evaluates the branch metrics and the aggregate metrics. During a state iteration, the Path Metric Computation Unit (110) computes the output samples that correspond to the two edges branching into the state under consideration. It compares the aggregate metrics of the entire two paths that enter this state, and this comparison determines the surviving path terminating at this state. Three indications related to the winner path are generated by the Path Metric Computation Unit, and these indications are used by the other units, as detailed below.

1. The output sample that corresponds to the winner path terminating at the state under consideration, is the main output of this module. This sample is also copied to the FIR Sample Banks (130) as the most recent sample.

2. The start state of the winner path determines the address of the FIR sequence to be copied form the old bank to the new one.

3. The metric of the winner path is routed out. This metric is stored at the new Metric Table (180) as the metric of the state currently processed. At the end of S state iterations, i.e., each symbol iteration, the Path Metric Computation Unit (110) also checks the S surviving paths, and determines the path with the lowest aggregate cost. The least recent sample of this chosen path is routed to the common samples filter (Com_Sam).

The following formulae provide an explicit description of the various operations performed by the Path Metric Computation Unit (110).

Computation of the two output samples that correspond to the two branches entering state j:

$$x_1=[a1(j,k)-FIL2-FIL1(S_1(j))]_{mod\ 2M},$$

$$x_2=[a2(j,k)-FIL2-FIL1(S_2(j))]_{mod\ 2M}.$$

Computing the aggregate metrics that correspond to the two paths:
If Fg=1, then $$T_1=(x_1)^2+Metric1(S_1(j)),$$

$$T_2=(x_2)^2+Metric1(S_2(j))$$

Else $$T_1=(x_1)^2+Metric2(S_1(j)),$$

$$T_2=(x_2)^2+Metric2(S_2(j))$$

Metrics comparison:

$$T=\min\ \{T_1,T_2\},\ ind=\arg\min\ \{T_1,T_2\},$$

Updating the corresponding metric value
If Fg=1, then $$Metric2(j)=T_{inch}, Sam2(j,1)=x_{inch}$$

Else $$Metric1(j)=T_{inch}, Sam1(j,1)=x_{inch},$$

All the above computations are performed for each of the trellis states for each symbol iteration. After the Path Metric Computation Unit (110) performs these computations for all the states, it examines the new metric table to find the minimum entry.
If Fg=1, $$i=\arg\min\ \{Metric2(1:S)\},$$

Else $$i=\arg\min\ \{Metric1(1:S)\},$$

where the function arg min is defined as follows:

$$\arg\min\{Y_{j_1}, Y_{j_2}, \ldots, Y_{j_N}\} = j_v, \text{ such that } Y_{j_v} = \min\{Y_{j_1}, Y_{j_2}, \ldots Y_{j_N}\}.$$

FIG. 8 is a flow chart illustrating a preferred method performed by the Iteration Computation Unit (70) of FIG. 3, corresponding to Fg=1. For Fg=0, metric1 is replaced by metric2, and Sam1 is replaced by Sam2, and vice versa.

State iteration: evaluation of the samples x(k) that correspond to the input symbols a(k), evaluation of the metrics of the two paths that enter each new trellis state, comparison between the two metrics, trace-back memory updating, and FIL1 computation. This computation is repeated for all trellis states. For state j and time instant k, the following computation is accomplished:

$$x_1 = [a1(j,k) - FIL2 - FIL1(S_1(j))]_{mod\ 2M},$$

$$x_2 = [a2(j,k) - FIL2 - FIL1(S_2(j))]_{mod\ 2M}.$$

If Fg=1, then $$T_1 = (x_1)^2 + Metric1(S_1(j)),$$

$$T_2 = (x_2)^2 + Metric1(S_2(j))$$

Else $$T_1 = (x_1)^2 + Metric2(S_1(j)),$$

$$T_2 = (x_2)^2 + Metric2(S_2(j))$$

End if $$T = \min\{T_1, T_2\}, ind = \arg\min\{T_1, T_2\}.$$

If Fg=1, then $$Metric2(j) = T_{ind}$$

$$Sam2(j,1) = x_{ind}$$

$$Sam2(j, 2:Tl) = Sam1(S_{ind}(j), 1:Tl-1)$$

$$TX(j) = Sam1(S_{ind}(j), Tl)$$

Else $$Metric1(j) = T_{ind}$$

$$Sam1(j,1) = x_{ind}$$

$$Sam1(j, 2:Tl) = Sam2(S_{ind}(j), 1:Tl-1)$$

$$TX(j) = Sam2(S_{ind}(j), Tl)$$

End if

The above computation is preferably repeated for all j values in the range $0 \le j \le S-1$. After this computation has been performed for all the S trellis states, the state iteration described below is preferably accomplished.

Symbol iteration: choosing the best trellis state, updating sample buffers, pruning-off illegal sequences, and computation of FIL2 (the common portion of the preceding filter):

If Fg = 1, then $$i = \arg\min\{Metric2(0:S-1)\}.$$

For l = 0:S-1, $$Fil1(l) = \sum_{i=1}^{Tl} g_1(i) \cdot Sam2(l, i)$$

if $TX(l) \ne TX(i)$, then $Metric2(l) = Max\_met$, end if

End of For loop

Else $$i = \arg\min\{Metric1(0:S-1)\}.$$

For l = 0:S-1, $$Fil1(l) = \sum_{i=1}^{Tl} g_1(i) \cdot Sam1(l, i)$$

if $TX(l) \ne TX(i)$, then $Metric1(l) = Max\_met$, end if

End of For loop

End if

Transmit TX(i): TX(i) is routed to the Whitening Filter input

For l = Cl:-1:2, Com_Sam(l) = Com_Sam(l − 1), end

Com_Sam(1) = TX(i)

$$Fil2 = \sum_{i=1}^{Cl} g_2(i) \cdot Com\_Sam(i).$$

Alter Fg value.

When all the metrics reach the same value, one of the sequences is typically chosen either by a predefined setting or at random. For trellis shaping it is preferable to guarantee a continuous path integrity in order to avoid systematic errors. Hence in each iteration, the trace-back memory of symbols is tested for discontinuities. For example, the metrics that correspond to the paths which do not coincide with the chosen path at the least recent sample of the trace-back memory may preferably be set to Max_met. The parameter Max_met may typically be set to the maximum value attained by the metrics. This operation ensures that invalid sequences are not generated by the method. It is also noted that the metric values may be scaled by subtracting a constant value from all metrics at the end of each symbol iteration, or few iterations.

Similarly, in a fixed-point implementation, the values reached by the metric array are preferably saturated when exceeding a predetermined value (which is induced by the specific bit resolution of the implementation).

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A method for transmitting data, including a succession of input data samples, over a channel having a given channel response, the method comprising:

generating a set of candidate signal point sequences responsive to the input data samples, such that the input data samples are recoverable from a final signal derived from the candidate sequences;

mapping the succession of input data samples into a succession of interim signal point sequences, selected from among the candidate signal point sequences according to a signal shaping criterion;

preceding the interim signal point sequences according to the given channel response and further according to a whitening transformation; and filtering the precoded sequences in accordance with the whitening transformation, thus generating the final signal to be transmitted over the channel to a receiver.

2. A method according to claim 1, wherein mapping the succession of input data samples comprises selecting from among the candidate signal point sequences responsive to relative powers thereof.

3. A method according to claim 2, wherein mapping the succession of input data samples comprises selecting from among the candidate signal point sequences so as to reduce a peak power of the interim signal point sequences.

4. A method according to claim 1, wherein generating the set of candidate signal point sequences comprises generating sequences associated with a finite state trellis diagram, and wherein mapping the succession of input data samples comprises searching through the trellis diagram.

5. A method according to claim 1, wherein mapping the succession of input data samples comprises performing a search based on a Viterbi algorithm.

6. A method according to claim 1, wherein mapping the succession of input data samples comprises selecting from among the candidate signal point sequences so as to reduce a peak power of the final signal.

7. A method for transmitting data, including a succession of input data samples, over a channel having a given channel response, the method comprising:

generating a set of candidate signal point sequences responsive to the input data samples, such that the input data samples are recoverable from a final signal derived from the candidate sequences;

mapping the succession of input data samples into a succession of interim signal point sequences, selected from among the candidate signal point sequences according to a signal shaping criterion;

preceding the interim signal point sequences according to the given channel response and further according to a whitening transformation; and filtering the precoded sequences in accordance with the whitening transformation, thus generating the final signal to be transmitted over the channel to a receiver, wherein preceding the interim signal point sequences comprises initiating the precoding responsive only to the given channel response and then adapting the preceding responsive to the whitening transformation.

8. A method according to claim 7, wherein adapting the precoding comprises performing a least-mean-squares adaptation.

9. A method according to claim 1, wherein filtering the precoded sequences comprises applying a finite impulse response (FIR) filter to the sequences.

10. A method according to claim 1, wherein filtering the precoded sequences comprises applying an infinite impulse response (IIR) filter to the sequences.

11. A method according to claim 1, wherein preceding the interim signal point sequences comprises processing the interim signal point sequences in an array of parallel precoders.

12. A method according to claim 1, wherein filtering the precoded sequences comprises selecting the whitening transformation such that the final signal comprises substantially uncorrelated samples.

13. Signal processing apparatus for use in a transmitter, which processes data, including a succession of input data samples, for transmission over a channel having a given channel response, the apparatus comprising:

a candidate set generator, which generates a set of candidate signal point sequences responsive to the input data samples, such that the input data samples are recoverable from a final signal derived from the candidate sequences;

an interim signal point sequence selector, which maps the succession of input data samples into a succession of interim signal point sequences, which are selected from among the candidate signal point sequences according to a signal shaping criterion;

a precoder, which precodes the interim signal point sequences according to the given channel response and further according to a whitening transformation; and a whitening filter, which filters the precoded sequences in accordance with the whitening transformation, thus generating the final signal.

14. Signal processing apparatus for use in a transmitter, which processes data, including a succession of input data samples, for transmission over a channel having a given channel response, the apparatus comprising:

a candidate set generator, which generates a set of candidate signal point sequences responsive to the input data samples, such that the input data samples are recoverable from a final signal derived from the candidate sequences;

an interim signal point sequence selector, which maps the succession of input data samples into a succession of interim signal point sequences, which are selected from among the candidate signal point sequences according to a signal shaping criterion;

a precoder, which precodes the interim signal point sequences according to the given channel response and further according to a whitening transformation, wherein the precoder initiates the preceding responsive only to the given channel response and then adapts the preceding responsive to the whitening transformation; and a whitening filter, which filters the precoded sequences in accordance with the whitening transformation, thus generating the final signal.

* * * * *